(12) United States Patent
Puttichaem et al.

(10) Patent No.: US 8,533,936 B1
(45) Date of Patent: Sep. 17, 2013

(54) SYSTEMS AND METHODS FOR PRE-HEATING ADJACENT BOND PADS FOR SOLDERING

(75) Inventors: Wachira Puttichaem, Lamphun (TH); Adisak Tokaew, Mahasarakham (TH); Aekasith Sapabodee, Ayutthaya (TH)

(73) Assignee: Western Digital (Fremont), LLC, Fremont, CA (US)

( * ) Notice: Subject to any disclaimer, the term of this patent is extended or adjusted under 35 U.S.C. 154(b) by 277 days.

(21) Appl. No.: 13/014,013

(22) Filed: Jan. 26, 2011

(51) Int. Cl.
*G11B 5/127* (2006.01)
*B23K 31/02* (2006.01)
*B23K 1/005* (2006.01)

(52) U.S. Cl.
USPC .................. 29/603.07; 360/234.5; 360/245.4; 219/121.66

(58) Field of Classification Search
USPC ............. 219/121.65, 121.66, 121.84, 121.85; 29/603.01, 603.04, 603.03, 603.06, 840, 29/843, 860, 603.07, 846; 228/180.1, 232, 228/180.22, 227, 230; 360/264.2, 266.3, 360/244.1, 245.8, 234.5, 245.4; 174/250, 174/260
See application file for complete search history.

(56) References Cited

U.S. PATENT DOCUMENTS

| | | | |
|---|---|---|---|
| 5,818,697 A * | 10/1998 | Armezzani et al. | 361/749 |
| 6,380,513 B1 * | 4/2002 | Remy De Graffenried | 219/121.85 |
| 6,384,366 B1 | 5/2002 | Wong | |
| 6,524,977 B1 | 2/2003 | Yamazaki et al. | |
| 6,543,677 B2 | 4/2003 | Pattanaik et al. | |
| 6,742,702 B2 * | 6/2004 | Abe | 228/220 |
| 6,858,943 B1 | 2/2005 | Peterson et al. | |
| 6,892,927 B2 | 5/2005 | Rumer et al. | |
| 7,164,097 B2 | 1/2007 | Shindo et al. | |
| 7,287,312 B2 * | 10/2007 | Yamaguchi | 29/603.04 |
| 7,348,515 B2 * | 3/2008 | Wagou et al. | 219/121.6 |
| 2007/0102485 A1 | 5/2007 | Fukaya et al. | |
| 2008/0237313 A1 | 10/2008 | Fukaya et al. | |
| 2009/0223937 A1 | 9/2009 | Wang et al. | |
| 2009/0298278 A1 * | 12/2009 | Tu et al. | 438/616 |

FOREIGN PATENT DOCUMENTS

DE 102005042361 A1 * 3/2007

* cited by examiner

Primary Examiner — Samuel M Heinrich

(57) ABSTRACT

Systems and methods for pre-heating adjacent bond pads for soldering are provided. In one embodiment, the invention relates to a method for soldering adjacent bond pads, the method including directing an ultraviolet light beam onto the bond pads from a first angle relative to the bond pads for a preselected duration, heating a solder, and depositing the solder onto the bond pads from a second angle relative to the bond pads during the preselected duration, wherein the second angle is different from the first angle.

14 Claims, 3 Drawing Sheets

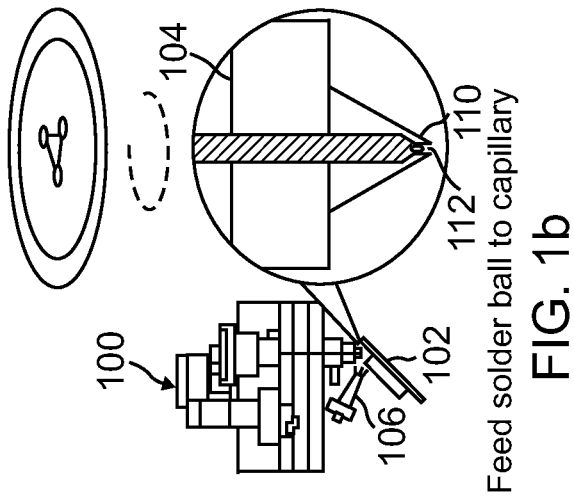
FIG. 1a  Move capillary to bonding target
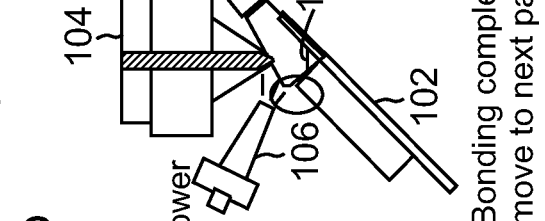
FIG. 1b  Feed solder ball to capillary
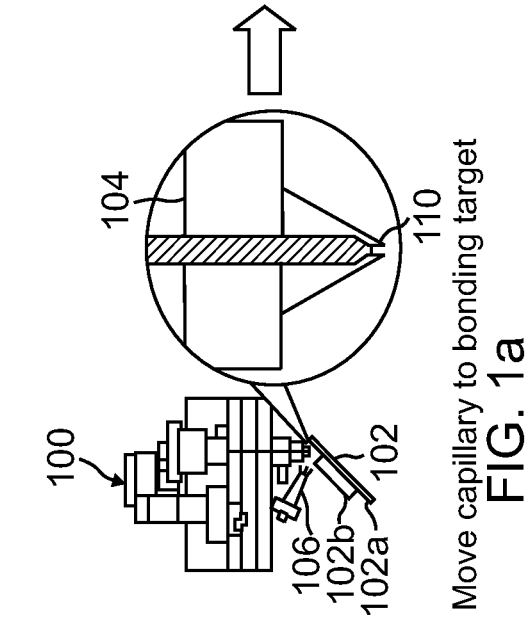
FIG. 1c  Solder melting by YAG laser and Pre-heat pad using UV
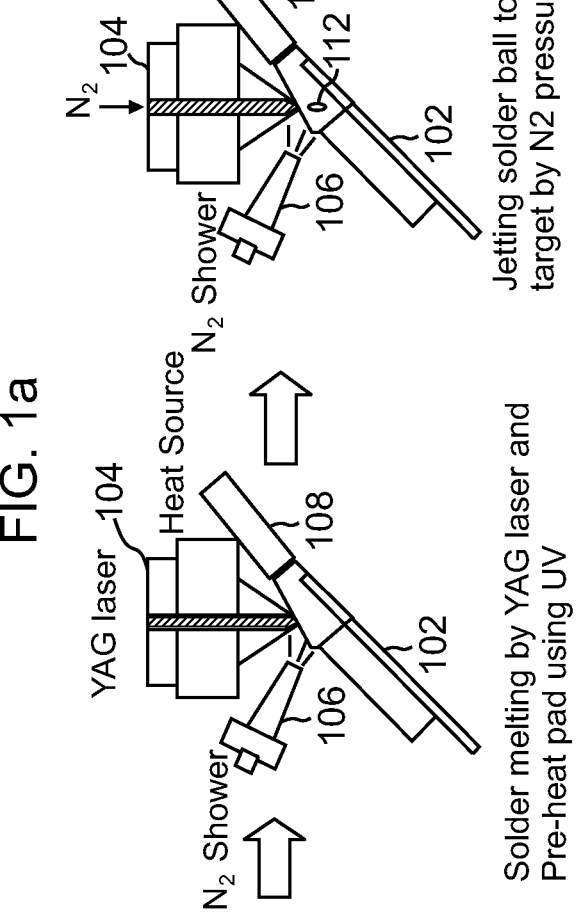
FIG. 1d  Jetting solder ball to bonding target by N2 pressure
FIG. 1e  Bonding completed and move to next pad

| Sample No. | Contact Angle (degree) | | | |
|---|---|---|---|---|
| | Conventional process | | Invention (Pre-heat using UV) | |
| | Slider Pad | Suspension Pad | Slider Pad | Suspension Pad |
| 1 | 24.35 | 13.17 | 21.54 | 8.57 |
| 2 | 24.63 | 21.70 | 22.48 | 8.53 |
| 3 | 25.23 | 11.46 | 21.99 | 8.13 |
| 4 | 25.25 | 10.71 | 21.45 | 8.75 |
| Mean | 24.87 | 14.26 | 21.87 | 8.50 |
| StDev | 0.45 | 5.07 | 0.47 | 0.26 |

SYSTEMS AND METHODS FOR PRE-HEATING ADJACENT BOND PADS FOR SOLDERING

FIELD

The present invention relates to information storage devices, and more specifically to systems and methods for pre-heating adjacent bond pads for soldering.

BACKGROUND

Information storage devices use magnetic media to store data and a movable read head or slider positioned over the magnetic media to selectively read data from and write data to the magnetic media. In a modern magnetic hard disk drive device, each read head is a sub-component of a head-gimbal assembly (HGA). The HGA also includes a suspension assembly for holding the read head and providing a plurality of electrical connections thereto. The suspension assembly typically includes a fragile laminated flexure to carry the electrical signals to and from the head. The HGA, in turn, is a sub-component of a head-stack assembly (HSA) that typically includes a plurality of HGAs, an actuator, and a flex cable. The plurality of HGAs are attached to various arms of the actuator, and each of the laminated flexures of the HGAs has a flexure tail that is electrically connected to the HSA's flex cable.

The read head is typically bonded to a tongue portion of the fragile laminated flexure by an adhesive, for example by an epoxy adhesive, and a soldering process for electrically coupling a pad on the flexure/suspension with a pad on the read head/slider. Conventional soldering processes use solder jet bonding to deposit a molten solder ball on the slider and suspension bond pads at room temperature. However, the molten solder ball can cause thermal shock at the bond pads, which can lead to solder creep, solder joint undercut, pitch static variations and other undesirable results. As such, an improved system and method for bonding adjacent bond pads is needed.

SUMMARY

Aspects of the invention relate to systems and methods for pre-heating adjacent bond pads for soldering. In one embodiment, the invention relates to a method for soldering adjacent bond pads, the method including directing an ultraviolet light beam onto the bond pads from a first angle relative to the bond pads for a preselected duration, heating a solder, and depositing the solder onto the bond pads from a second angle relative to the bond pads during the preselected duration, wherein the second angle is different from the first angle.

BRIEF DESCRIPTION OF THE DRAWINGS

FIGS. 1a-1e show a sequence of side views of a soldering assembly and a work piece illustrating a process for pre-heating adjacent pads of the work piece using ultraviolet light before bonding the pads in accordance with one embodiment of the invention.

DETAILED DESCRIPTION

Figures 2, 3:
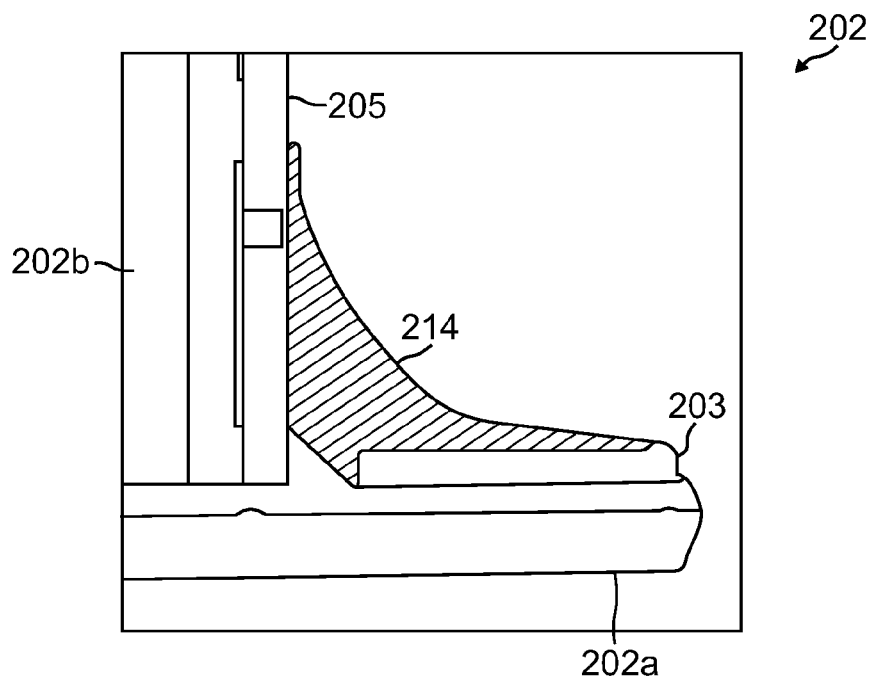
FIG. 2 is a side view of a solder joint for adjacent pads that were pre-heated using ultraviolet light in accordance with one embodiment of the invention.
FIG. 3 is a table illustrating a comparison of the contact angle of each solder joint on the adjacent pads for a conventional process versus a process using pre-heating and ultraviolet light in accordance with one embodiment of the invention.

Referring now to the drawings, embodiments of systems and processes for pre-heating adjacent pads of a work piece using ultraviolet light are illustrated. In several embodiments, a soldering apparatus is controlled to direct an ultraviolet light beam onto adjacent pads from a first angle and for a preselected duration. The soldering apparatus can heat solder for a joint to be formed between the adjacent pads. The soldering apparatus can then deposit the solder onto the adjacent bond pads from a second angle during the preselected duration, where the second angle is different from the first angle. In a number of embodiments, the solder joint that results from the processes described herein are more robust than a solder joint formed by conventional processes. In several cases, the improved process avoids the thermal shock at the bond pads, thereby avoiding solder creep, solder joint undercut, pitch static variations and other undesirable results common to the conventional processes.

FIGS. 1a-1e show a sequence of side views of a soldering assembly 100 and a work piece 102 illustrating a process for pre-heating adjacent pads of the work piece 102 using an ultraviolet light source 108 before bonding the pads in accordance with one embodiment of the invention. The soldering assembly 100 includes a laser 104, a nitrogen dispenser 106, and the ultraviolet heat source 108. The work piece 102 includes a slider 102b mounted to a suspension 102a, where the slider 102b and suspension 102a each have one or more pads (not visible) positioned near a point (e.g., bonding target) where the two components meet. In several embodiments, this point will become the location of the solder joint.

FIG. 1a illustrates the soldering assembly 100 and work piece 102 as a solder capillary tube 110 of the soldering assembly 100 is positioned over a bonding target of the work piece 102. In several embodiments, the soldering assembly 100 receives instructions from a control program directing it to move such that the capillary tube 110 is positioned over the bonding target.

FIG. 1b illustrates the soldering assembly 100 and work piece 102 as a solder ball 112 is extended to the capillary tube 110. A singulation disk, shown directly above laser 104, is configured to receive solder balls within the solder assembly 100, like solder ball 112, and rotate them such that they are positioned above the capillary tube 110.

FIG. 1c illustrates the soldering assembly 100 and work piece 102 as the UV heat source 108, the nitrogen dispenser/shower 106, and laser 104 are activated at about the same time. In several embodiments, each component can be activated for a preselected duration.

FIG. 1d illustrates the soldering assembly 100 and work piece 102 as a solder ball 112 is expelled from the capillary tube of the laser 104 toward the bonding target. In several embodiments, the solder ball 112 is urged from the capillary tube toward the bonding target by nitrogen pressure applied by the nitrogen source 106. In some embodiments, the laser 104 does not allow the solder ball 112 to be expelled until a preselected duration for the UV pre-heating has expired.

FIG. 1e illustrates the soldering assembly 100 and work piece 102 as a solder ball 112 has melted and formed a solder joint 114 between the adjacent bond pads positioned on the suspension 102a and slider 102b. In several embodiments, the soldering apparatus 100 can repeat the process for another set of adjacent pads. In one embodiment, there are several sets of adjacent pads along the line where the suspension 102a and slider 102b meet and the soldering apparatus 100 moves along that line to solder each of the sets of adjacent pads, thereby forming several electrical connections between the suspension 102a and the slider 102b.

In FIGS. 1a-1e, the work piece is a suspension and slider for a head gimbal assembly of a storage drive. In other embodiments, the process can be used with other work pieces having adjacent pads that need to be soldered.

FIG. 2 is a side view of a solder joint 214 for adjacent pads (203, 205) of a work piece 202 that were pre-heated using ultraviolet light in accordance with one embodiment of the invention. The work piece 202 includes a first substrate 202a having first pad 203 positioned on a top surface of the first substrate 202a. The work piece 202 also includes a second substrate 202b having second pad 205 positioned on an outer surface of the second substrate 202b. The adjacent pads (203, 205) were pre-heated using ultraviolet light and a robust solder joint 214 was formed. As can be seen from FIG. 2, the contact angle, or angle at which the solder meets the substrate surface, for each pad is relatively small. In general, the smaller the resulting contact angle, the more robust the solder joint will be.

FIG. 3 is a table illustrating a comparison of the contact angle of a number of solder joints on adjacent pads for a conventional process versus a process using pre-heating and ultraviolet light in accordance with one embodiment of the invention. As can be observed from FIG. 3, the use of ultraviolet light to pre-heat adjacent bond pads in the improved process fairly significantly reduces the contact angle of the resulting solder joints as compared to conventional processes.

Figure 4:
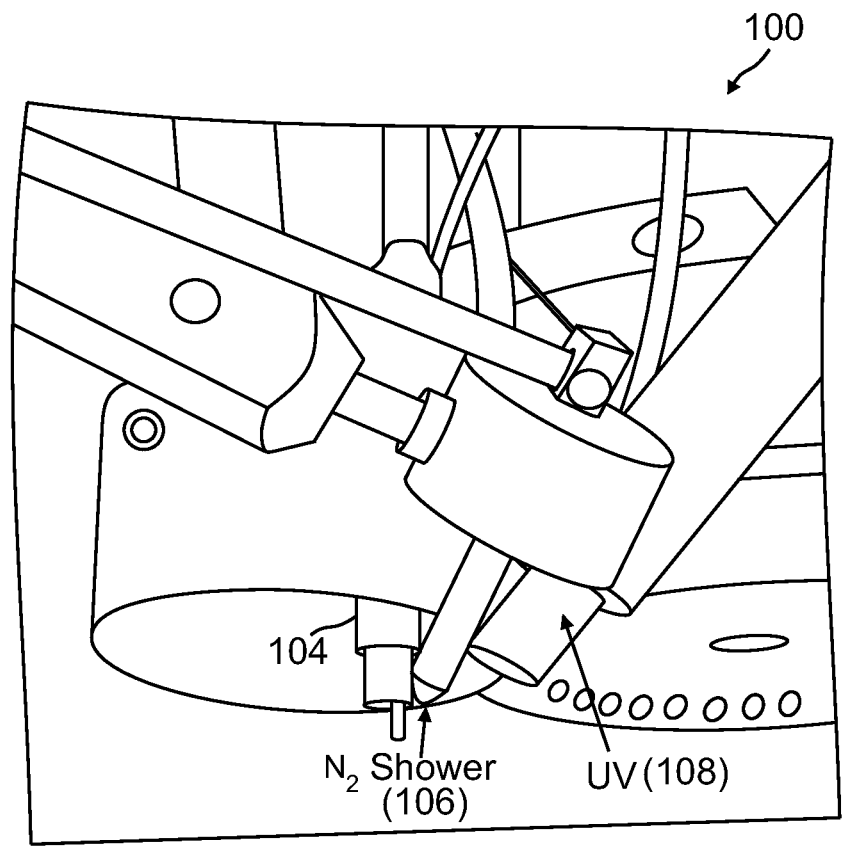
FIG. 4 is a perspective view of a soldering assembly that includes a solder dispenser, a nitrogen shower, and an ultraviolet light source in accordance with one embodiment of the invention.

FIG. 4 is a perspective view of a soldering assembly 100 that includes a solder dispenser/laser 104, a nitrogen shower 106, and an ultraviolet light source 108 in accordance with one embodiment of the invention.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In FIGS. 1c-1e, the UV heat source 108 is positioned at a preselected distance from the bonding target of the work piece 102. In one embodiment, the preselected distance is about 0.5 to 1.5 centimeters (cm). In other embodiments, the preselected distance can be increased or decreased beyond 0.5 to 1.5 cm. In several embodiments, the intensity of the UV heat source can varied for best results.

What is claimed is:

1. A method for soldering adjacent bond pads, the method comprising:
   directing an ultraviolet light beam onto the bond pads from a first angle relative to the bond pads for a preselected duration;
   heating a solder; and
   depositing the solder onto the bond pads from a second angle relative to the bond pads during the preselected duration, wherein the second angle is different from the first angle.

2. The method of claim 1, further comprising:
   directing nitrogen onto the bond pads from a third angle relative to the bond pads during the preselected duration, wherein the third angle is different from the first angle and the second angle.

3. The method of claim 1:
   wherein the ultraviolet light beam is directed using a ultraviolet light source, and
   wherein the solder is deposited using a solder dispensing machine comprising a laser for heating the solder.

4. The method of claim 3, further comprising:
   directing nitrogen onto the bond pads from a third angle relative to the bond pads during the preselected duration, wherein the third angle is different from the first angle and the second angle,
   wherein the nitrogen is directed onto the bond pads using a nitrogen dispenser.

5. The method of claim 4, wherein the ultraviolet light source, the solder dispensing machine, and the nitrogen dispenser are each positioned at different locations in proximity to the bond pads.

6. The method of claim 1, wherein the preselected duration is less than 10 minutes.

7. The method of claim 1, wherein the adjacent bond pads comprise a slider bond pad and a suspension assembly bond pad.

8. The method of claim 7, wherein the slider bond and the suspension assembly bond pad are components of a head gimbal assembly of a magnetic storage device.

9. The method of claim 1, wherein the heating the solder comprises heating the solder with a laser.

10. The method of claim 1, wherein the depositing the solder onto the bond pads comprises dispensing the solder from a capillary tube of a solder dispensing machine.

11. The method of claim 10, wherein the heating the solder comprises heating the solder within the capillary tube using a laser.

12. The method of claim 1, wherein the directing the ultraviolet light beam onto the bond pads comprises directing the ultraviolet light beam onto the bond pads until a temperature of the bond pads is in a range of about 50 to 80 degrees Celsius.

13. The method of claim 1, wherein the directing the ultraviolet light beam onto the bond pads comprises directing the ultraviolet light beam onto the bond pads until a temperature of the bond pads is in a range of about 50 to 100 degrees Celsius.

14. The method of claim 1:
   wherein the depositing the solder onto the bond pads comprises dispensing the solder from an output of a solder dispensing machine; and
   wherein the method further comprises:
      directing nitrogen onto the bond pads and onto the output of the solder dispensing machine from a third angle relative to the bond pads during the preselected duration, wherein the third angle is different from the first angle and the second angle.

* * * * *

UNITED STATES PATENT AND TRADEMARK OFFICE
CERTIFICATE OF CORRECTION

| | | |
|---|---|---|
| PATENT NO. | : 8,533,936 B1 | Page 1 of 1 |
| APPLICATION NO. | : 13/014013 | |
| DATED | : September 17, 2013 | |
| INVENTOR(S) | : Wachira Puttichaem et al. | |

It is certified that error appears in the above-identified patent and that said Letters Patent is hereby corrected as shown below:

On title page

Item (75) "Inventors", Third Reference "Sapabodee" should read --Sapapbodee--.

Signed and Sealed this
Twenty-sixth Day of May, 2015

Michelle K. Lee
*Director of the United States Patent and Trademark Office*